(No Model.) 2 Sheets—Sheet 1.

A. C. ROGERS.
MOWING MACHINE.

No. 348,239. Patented Aug. 31, 1886.

Witnesses
Percy G. Bowen.
E. G. Siggers.

Inventor
Albert C. Rogers:
By his Attorneys
C. A. Snow & Co.

(No Model.) 2 Sheets—Sheet 2.
A. C. ROGERS.
MOWING MACHINE.
No. 348,239. Patented Aug. 31, 1886.
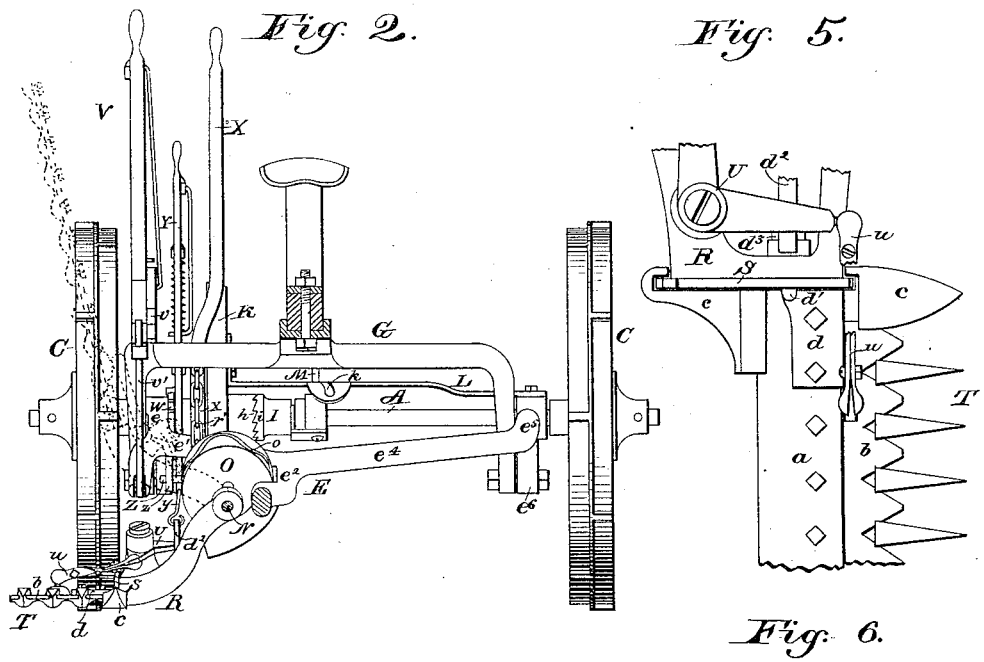
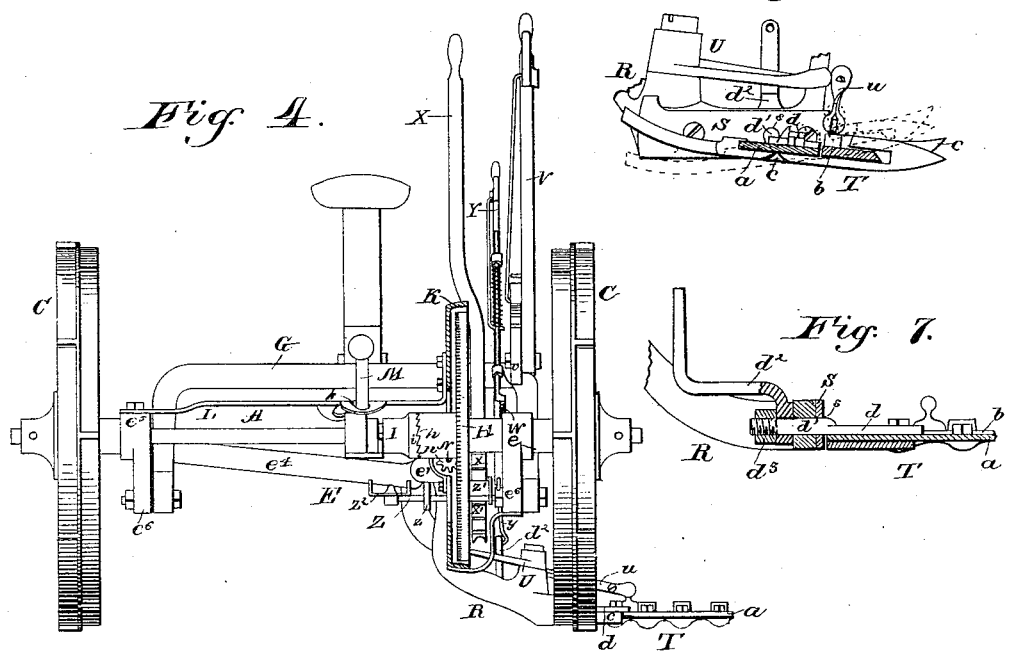
Witnesses
Percy G. Bowen.
E. G. Siggers
Inventor
Albert C. Rogers:
By his Attorneys
C. A. Snow & Co.

UNITED STATES PATENT OFFICE.

ALBERT C. ROGERS, OF LITTLE GENESEE, NEW YORK.

MOWING-MACHINE.

SPECIFICATION forming part of Letters Patent No. 348,239, dated August 31, 1886.

Application filed November 9, 1885. Serial No. 182,290. (No model.)

*To all whom it may concern:*

Be it known that I, ALBERT C. ROGERS, a citizen of the United States, residing at Little Genesee, in the county of Allegany and State of New York, have invented a new and useful Improvement in Mowing-Machines, of which the following is a specification, reference being had to the accompanying drawings.

This invention relates to an improvement in mowing-machines; and it consists in the peculiar construction and combination of parts, that will be fully set forth hereinafter, and particularly pointed out in the claims.

Figure 1:
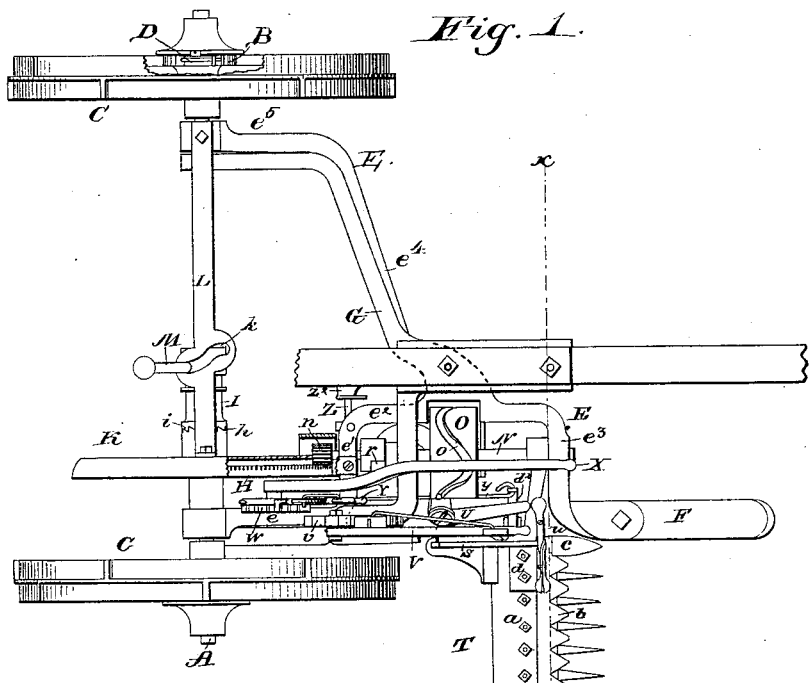
Figure 3:
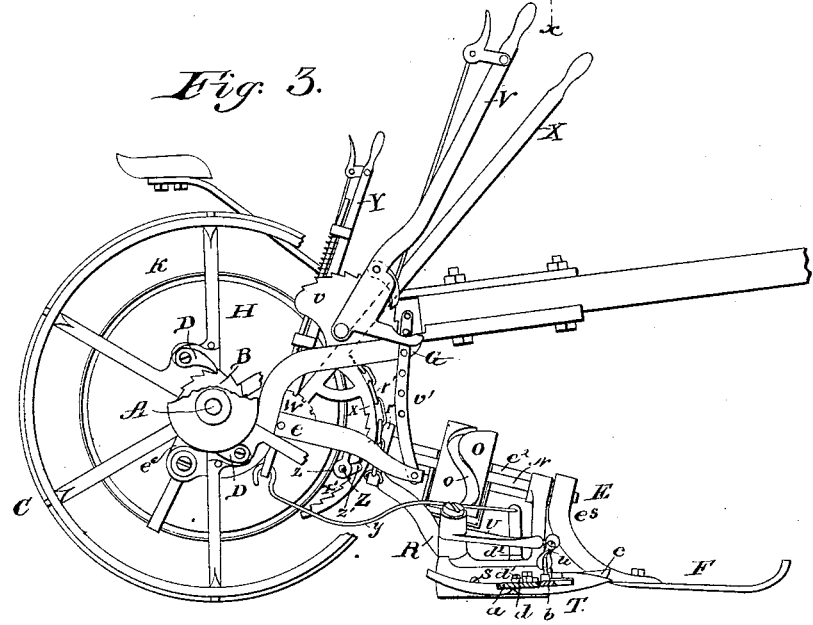

In the accompanying drawings, Figure 1 is a top plan view of my invention. Fig. 2 is partly a front elevation and partly a sectional view of the same, taken on the line $x\,x$ of Fig. 1. Fig. 3 is a side elevation of my invention, partly in section. Fig. 4 is a rear elevation, partly in section. Figs. 5, 6, and 7 are detail views.

A represents the main or driving shaft, on the ends of which are secured fixed ratchet-wheels B. Supporting-wheels C are loosely mounted on the shaft A, and bear against the ratchet-wheels B, and are provided with spring-actuated pawls D, which engage with the ratchet-teeth as the machine advances, so as to cause the shaft A to rotate with the wheels. When the machine is backed, the pawls slip idly over the ratchet-teeth and prevent the shaft A from rotating with the driving-wheels.

E represents a frame which is constructed in the form shown in Figs. 2 and 3, and is hinged loosely on the shaft A. The right side of the frame E extends forward in a straight line for a suitable distance, as at $e$, and is then bent at right angles and extends transversely toward the center of the frame, as at $e'$, where it is again bent forwardly and extends parallel to the portion $e$, as at $e^2$. The outer end of the portion $e^2$ is bent at right angles, as at $e^3$, and extends outwardly and downward toward the right-hand side of the machine, forming an arm, to the lower end of which is bolted a shoe or runner, F, which slides upon the ground in advance of and slightly on the inner side of the right-hand driving-wheel. From the portion $e^2$, near the center thereof, extends the outwardly and rearwardly extending arm $e^4$, which extends to the left-hand side of the machine, and is there bent nearly at right angles to form an arm, $e^5$, which is hinged on the shaft A. From the lower side of the hinge or eye portion of the arms $e$ and $e^5$ of the frame E depends arms $e^6$, to which is pivoted the tongue-frame G.

H represents a large gear-wheel, which is loosely mounted on the shaft A on the right-hand side of the machine, said gear-wheel having an inwardly-projecting hub provided with teeth or serrations $h$ on its inner edge.

I represents a sliding clutch, which is feathered or splined on the shaft A, and is provided with teeth or serrations $i$ on its outer side, which engage with the toothed hub of the wheel H to cause said wheel to rotate with the shaft A.

A circular casing or box K encircles the wheel H, and is secured to the portion $e'$ of the frame E. To the inner side of this casing is bolted a flat bar, L, which extends transversely across the machine, above the shaft A, the outer end of said bar being secured on the eye of the arm $e^5$. An oblique slot, $k$, forming a compound curve, is cut in the bar L, and through this slot extends a lever arm, M, that is swiveled to the sliding clutch. By giving this lever-arm a forward movement in the slot, the clutch is disengaged from the wheel H, and by moving said lever rearwardly the clutch is thrown into engagement with the wheel H, as will be readily understood.

N represents a shaft that has its bearings in the portions $e'$ and $e^3$ of the frame E. To the rear end of this shaft is fixed a pinion, $n$, that meshes with the wheel H, and near the longitudinal center of the shaft is fixed a cam-wheel, O, which is provided with a serpentine groove, $o$, in its periphery.

R represents a frame, which is hinged or pivoted on the shaft N, and extends at right angles from said shaft, the arms of the frame R being curved, so as to cause its outer end to approach the ground and to run nearly in contact therewith. A plate, S, is bolted on the outer end of the frame R, and the ends of said plate extend slightly beyond the sides of said frame, these ends of the plate being rounded or curved to form concentric arcs drawn from the center of an opening, $s$, that extends transversely through the plate S and the outer end of the frame R.

T represents the cutting mechanism, which consists of the finger-bar $a$ and the cutter-bar $b$. To the inner end of the finger-bar is bolted a shoe, $c$, in the ends of which are formed grooves that fit over the extended ends of the plate S. A plate, $d$, is bolted on the upper side of the shoe $c$, and from the inner end of said plate extends a pivotal bolt, $d'$, that passes through the opening $s$. The inner portion of this bolt is squared to receive a right-angled arm, $d^2$, which is secured on said bolt by means of a nut, $d^3$. By this construction it will be readily seen that the cutting apparatus is pivoted on the end of the frame R, so that the ends of the fingers and knives may be inclined—that is to say, raised or lowered from the ground by moving the arm $d^2$.

U represents a bell-crank lever, which is fulcrumed on the rear arm of the frame R near the outer end of said frame. The inwardly-extending arm of this lever is provided with an anti-friction roller, which bears in the groove of the cam-wheel O, and the outer forwardly-extending arm of said lever is connected to the cutter-bar by means of a connecting-rod, $u$. This connecting-rod is secured to the lever and the cutter-bar by ball-and-socket joints, as shown, so as to permit the finger-bar to partly rotate on the end of the frame R, as previously described.

V represents a hand-lever, which is fulcrumed to a segmental ratchet-plate, $v$, that is formed with the tongue-frame. A rod, $v'$, connects the frame E with the said hand-lever, and the latter is provided with a pawl or detent that engages with the teeth of the segmental plate $v$, so as to secure the said lever in any desired position. When the lever V is moved forward, the frame E is lowered to the ground, and when the lever V is moved backward the frame E is raised from the ground, and thereby raises the inner end of the cutting mechanism. A segmental rack-plate, W, is secured to the portion $e$ of the frame E, and to said plate is pivoted a hand-lever, X, and a similar lever, Y, both levers being pivoted at the same point. The lever Y is provided with a spring-actuated bolt that engages with the rack-teeth of the plate W, and said lever has a lower extended arm, which is connected to the right-angled arm $d^2$ by means of a rod, $y$, whereby the cutting mechanism may be tilted or inclined, so as to raise the points of the fingers from the ground when it is desired to pass over a slight obstruction, without raising the cutting mechanism entirely from the ground. The lever X has a segmental arm, $x$, which is provided on its inner side with a series of ratchet-teeth, $x'$. A shaft, Z, is journaled in ears $z$, that depend from the portion $e'$ of the frame E, and this shaft is provided with a detent, $z'$, that engages with the ratchet-teeth $x'$, and has also a pedal, $z^2$, by means of which the shaft may be turned, so as to cause the detent to disengage the teeth $x'$.

The rear pivoted portion of the frame R is provided with an arm, $r$, which is connected to the lever X by means of a chain, $r'$, which bears in a groove cut in the outer side of the segmental arm $x$.

By moving the arm X rearwardly the frame R, and consequently the cutting apparatus, will be raised from the ground to a vertical position, as shown in dotted lines in Fig. 2.

Having thus described my invention, I claim—

1. In a mowing-machine, the combination of the hinged frame E, having the operating-shafts N, the frame R, hinged to the said shaft and extending at right angles from frame E, the cutting apparatus having its inner end pivoted to frame R and adapted to rock or tilt, so as to raise and lower the forward ends of the fingers and cutting-knives, the lever Y, connected to the cutting apparatus, to tilt or incline the same, and the lever V, to raise and lower the frame E, substantially as described.

2. In a mowing-machine, the combination of the frame E, having the operating-shaft N, the frame R, hinged to the said shaft and extending at right angles from frame E, the cutting apparatus pivoted to frame R, and thereby adapted to rock or tilt, the lever Y, connected to the cutting apparatus, means for locking the said lever in any desired position, and the lever X, connected to frame R, to raise and lower the latter, and thereby raise or lower the outer end of the cutting apparatus, substantially as described.

3. In a mowing-machine, the combination of the frame E, the shaft N, journaled therein and having the grooved cam-wheel, mechanism for rotating the shaft, the frame R, hinged on the shaft N and extending at right angles from frame E, the bell-crank lever pivoted on frame R and engaging the cam-wheel, the cutting apparatus having its inner end pivoted to the frame R, and thereby adapted to tilt or rock, and the connecting-rod flexibly jointed to the cutter-bar and to the bell-crank lever, substantially as described.

4. The combination, in a mowing-machine, of the pivoted frame E, the frame R, hinged to frame E, the cutting apparatus having its inner end attached to frame R, the lever V, to raise or lower the frame E, and thereby raise or lower the inner end of the cutting apparatus, and the lever X, connected to frame R, to turn the same on its hinge or pivot, and thereby raise or lower the outer end of the cutting apparatus, substantially as described.

5. In a mowing-machine, the combination of the hinged frame R, the shaft carrying the grooved cam-wheel, mechanism for rotating said shaft, the bell-crank lever pivoted on frame R and engaging with the cam-wheel, the cutting apparatus pivoted to the said frame so as to rock laterally, and the connecting-rod having flexible joints connected to the cutter-bar, and the bell-crank lever, substantially as described.

6. The combination, in a mowing-machine, of the driving-shaft having the supporting-wheels, and the gear-wheel H, the frame E, hinged to the said shaft, the hinged tongue-frame, the shaft N, journaled in frame E and having the cam-wheel, and the pinion meshing with wheel H, the frame R, pivoted or hinged on shaft N and extending laterally from frame E, the cutting apparatus having its inner end pivoted to frame R, the bell-crank lever pivoted to frame R and engaging the cam-wheel, the connecting-rod jointed to the said lever and the cutter-bar, the lever V, to raise and lower frame E, the lever X, to raise and lower frame R, and the lever Y, to tilt or incline the cutting apparatus, substantially as described.

In testimony that I claim the foregoing as my own I hereto affix my signature in presence of two witnesses.

ALBERT C. ROGERS.

Witnesses:
P. W. COYLE,
W. C. McBRIDE.